United States Patent

Lewin et al.

Patent Number: 5,357,313
Date of Patent: Oct. 18, 1994

[54] CROPPER

[76] Inventors: Gideon Lewin, 25 W. 39th St., New York, N.Y. 10018; Ted Fahn, Nyhavn 51, 1051 Copenhagen K, Denmark

[21] Appl. No.: 103,550
[22] Filed: Feb. 4, 1994
[51] Int. Cl.⁵ .......................................... G03B 27/58
[52] U.S. Cl. ......................................................... 355/74
[58] Field of Search ................................................ 355/74

[56] References Cited

U.S. PATENT DOCUMENTS

| | | | |
|---|---|---|---|
| 3,709,591 | 1/1973 | Alzmann | 355/74 X |
| 4,190,357 | 2/1980 | Kostiner | 355/74 |
| 4,208,124 | 6/1980 | Fox | 355/74 X |
| 4,568,180 | 2/1986 | Kogane | 355/74 |
| 4,583,837 | 4/1986 | Shiga | 355/75 |
| 4,609,268 | 9/1986 | Crawford | 355/25 |
| 4,854,049 | 8/1989 | Kuhtik | 33/464 |
| 5,045,878 | 9/1991 | Taeger | 355/74 |
| 5,086,317 | 2/1992 | Sugishima et al. | 355/74 X |
| 5,115,271 | 5/1992 | Hagopian | 355/74 |

*Primary Examiner*—Michael L. Gellner
*Assistant Examiner*—Daniel P. Malley

[57] ABSTRACT

The cropper consists of two pieces of thin, rigid material (i.e. steel, aluminum, plastic, fiberglass, etc.). The smaller piece fits into the flanged track of the larger piece, and slides freely up and down inside the larger piece allowing for infinite variations of the framed area.

8 Claims, 7 Drawing Sheets

CROPPER

PRODUCT DESCRIPTION

The cropper is a tool used to show what the precise boundaries of a small image (i.e. photograph, graphic design, etc.) will look like once that image has been enlarged or reduced to a given format (i.e. square or rectangle) and size. The cropper is unique in that it offers two common formats in a simple, two piece sliding mechanism; these formats conform to the most commonly used formats employed in the photography and advertising industries.

The cropper's two formats are windows that change in size, but always maintain the same shape and proportion. The first of the two formats is a square, and the second is a rectangle. A user of the cropper places the preferred window over the working image, and manipulates the size of the window to show what parts of that image will be maintained when enlarged or reduced to that window's proportions. The window not being used is ignored.

The cropper allows a person to work easily with the two most commonly used media proportions in one convenient tool. This provides a compactness, ease of use and simplicity of manufacturing that cannot be found in any other tool of similar function.

DESCRIPTION ON DRAWINGS

Figure 1:
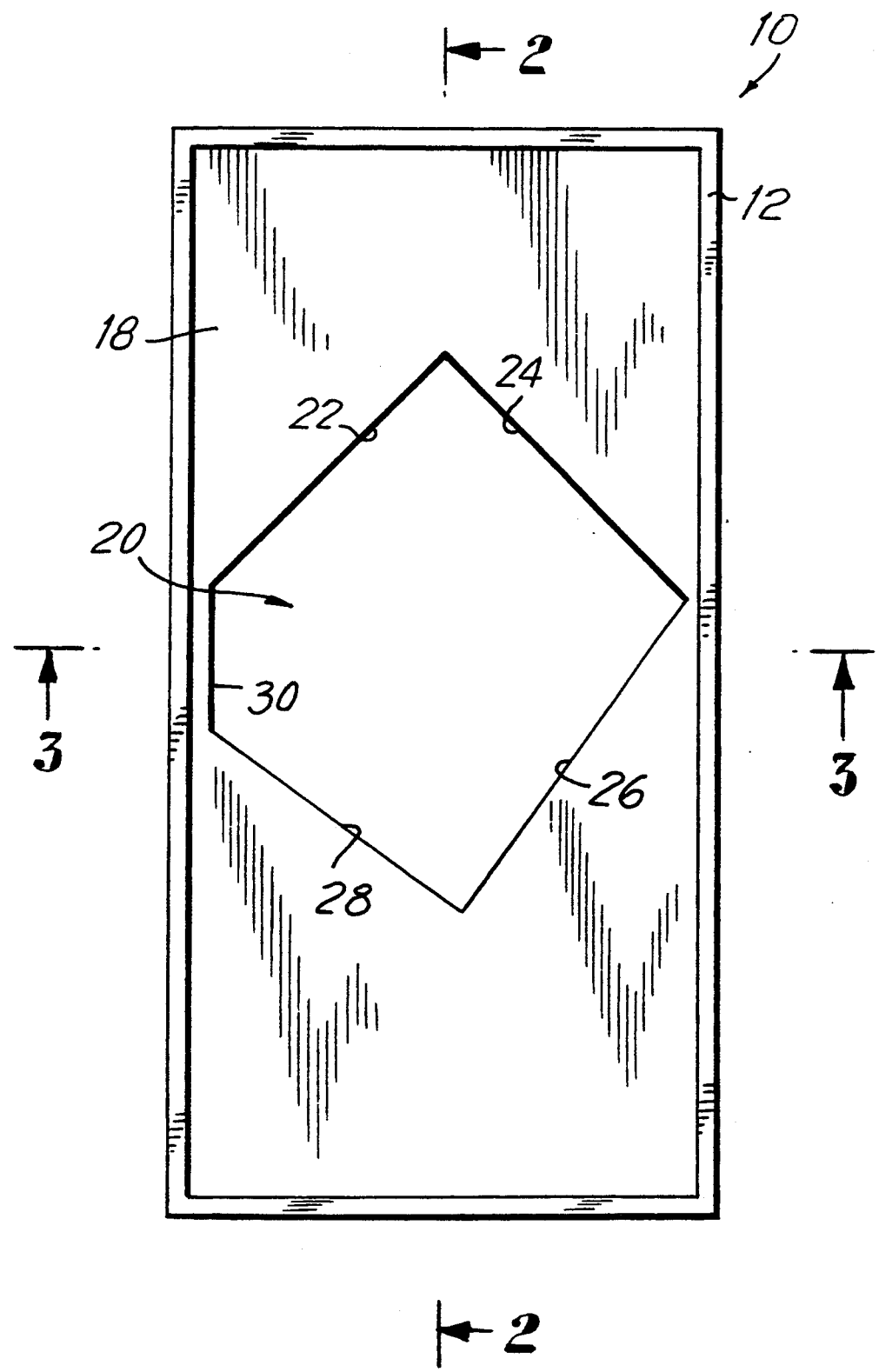
FIG. 1 is a front view of the frame member.
Figure 2:
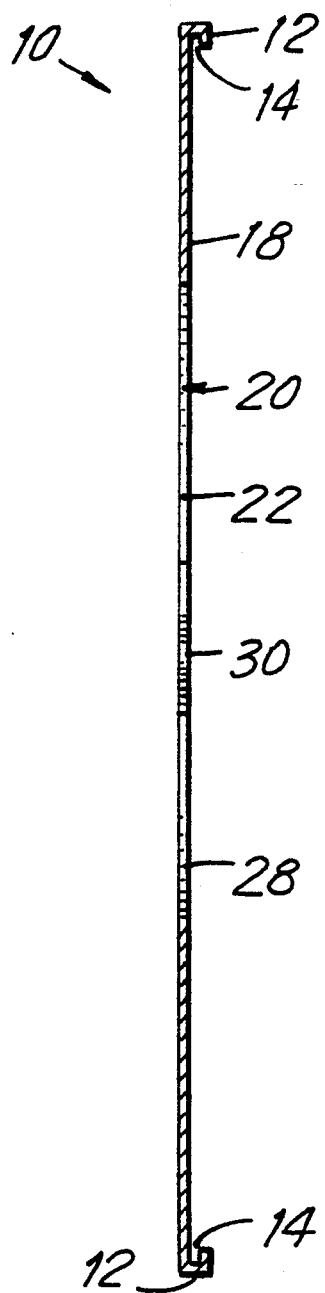
FIG. 2 is a cross section along the lines 2—2 of FIG. 1.
Figure 3:
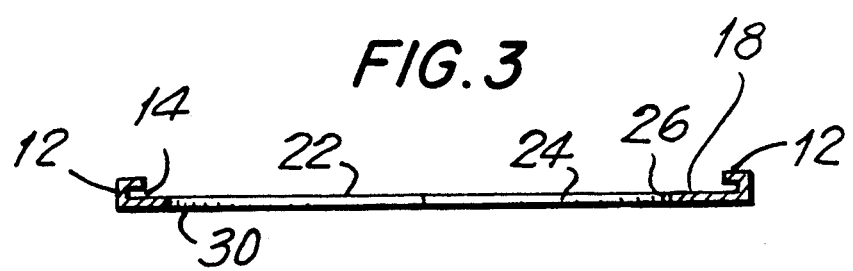
FIG. 3 is a cross section along the lines 3—3 of FIG. 1.

In the drawings, FIGS. 1, 2, and 3 show a rectangular frame member 10 having a peripheral flange 12 with a channel recess 14 for receiving a slide member 16 therein. Frame 10 has a flat surface 18 with a pentagonal aperture 20. Aperture 20 is bounded by interior side edges 22, 24, 26, 28, 30.

Figure 4:
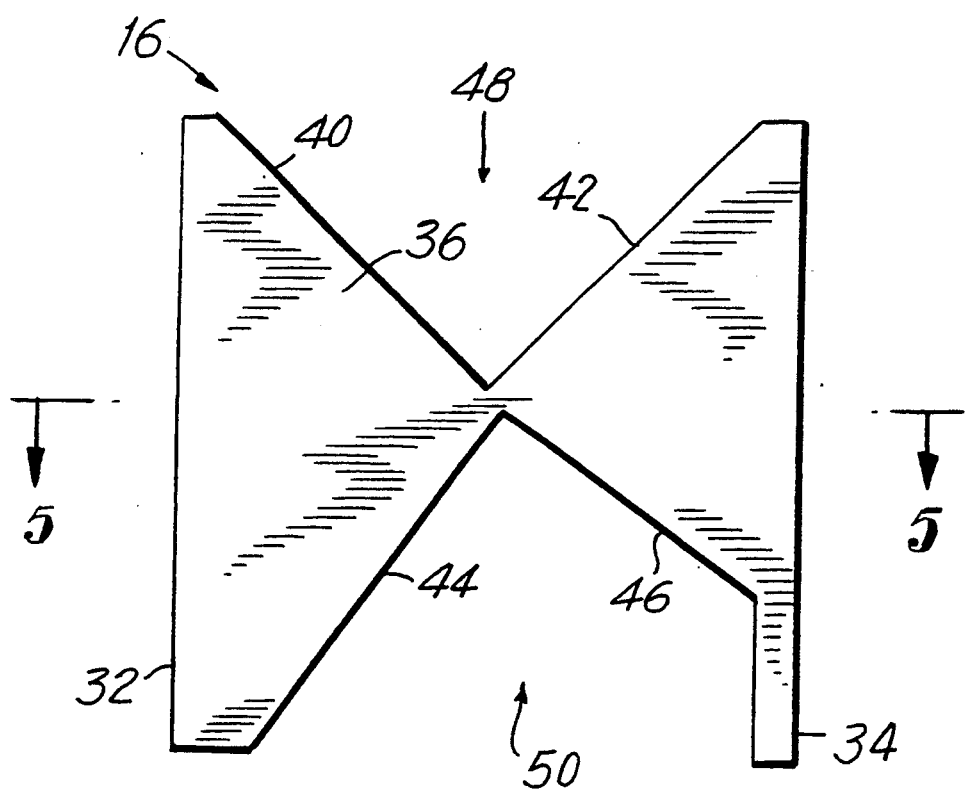
FIG. 4 is a front view of the slide plate.
Figure 5:
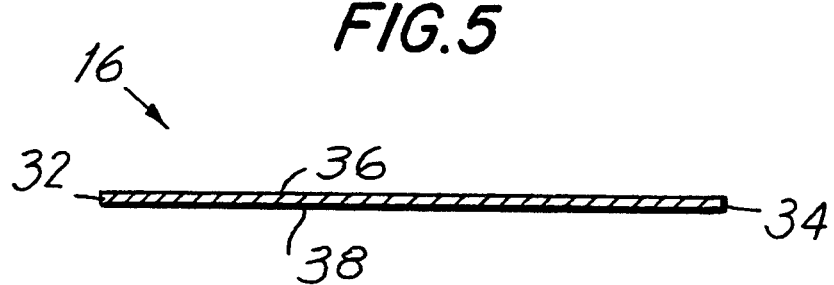
FIG. 5 is a cross section along the lines 5—5 of FIG. 4.

Frame 10 receives the slide member 16 which can move within channel recess 14. As best seen in FIGS. 4 and 5, slide member 16 is constructed of a flat, relatively thin plate, bounded by side edges 32 and 34, front & rear surfaces 36 and 38, and oblique interior edges 40, 42, 44, 46. Edges 40 and 42 form a cut out region 48. Edges 44 and 46 form a cut out region 50.

In use, and as best seen in FIGS. 6, 7, 8, 9, side edges 32 and 34 of slide member 16 fit into channel recesses 14 of flanges 12 of frame 10. Rear surface 38 of slide 16 moves freely on flat surface 18 of frame 10, effectively permitting varying, essentially square or rectangular openings, to be created by the position of the slide plate 16 and the frame 10.

Figure 6:
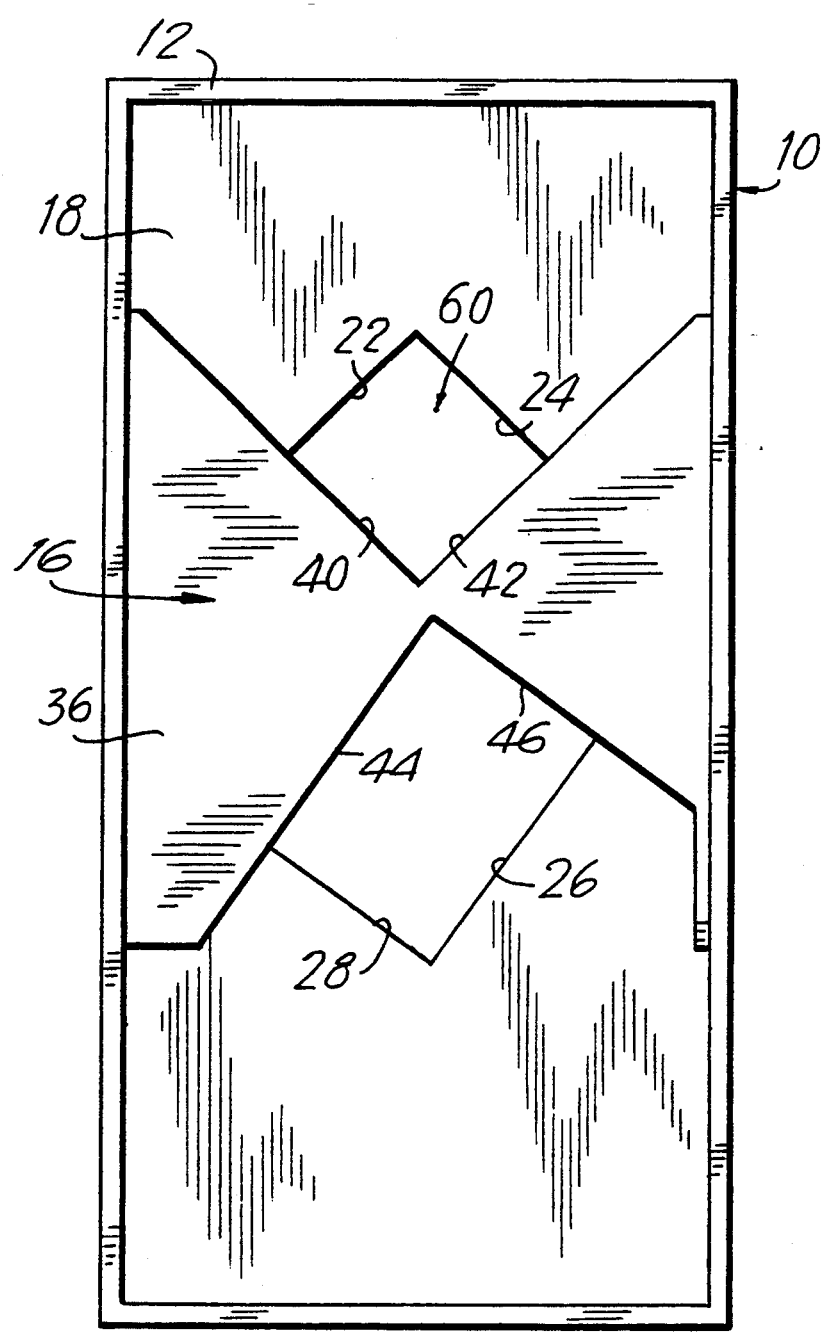
FIG. 6 is a front view of the combination of the frame and slide plate.

In FIG. 6, for example, the square opening 60 is created by sliding the slide plate 16 to the position shown, so that a portion of edges 22 and 24 of frame 10 and a portion of edges 40 and 42 of slide plate 16 form four equal lengths to make the square opening.

Figure 7:
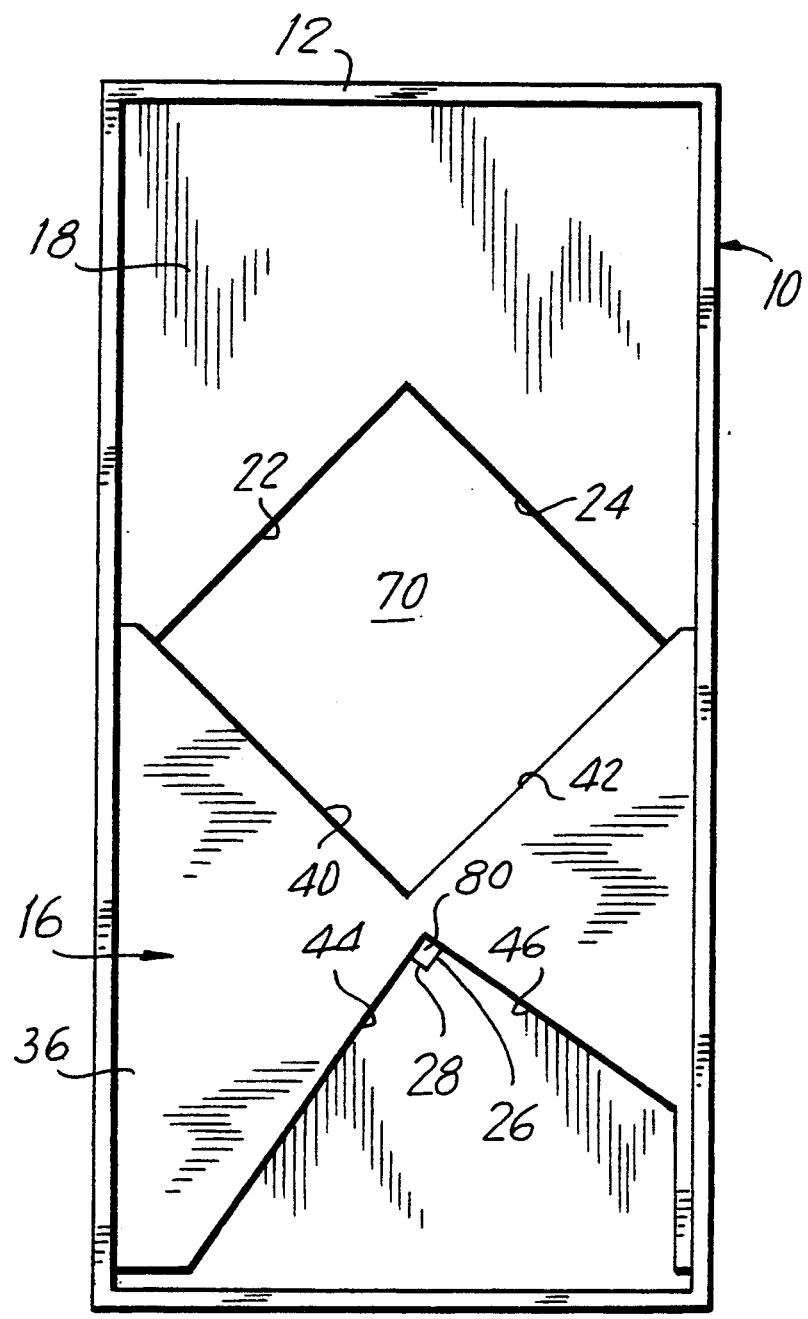
FIG. 7 is a view similar to FIG. 6 in another position.
Figure 8:
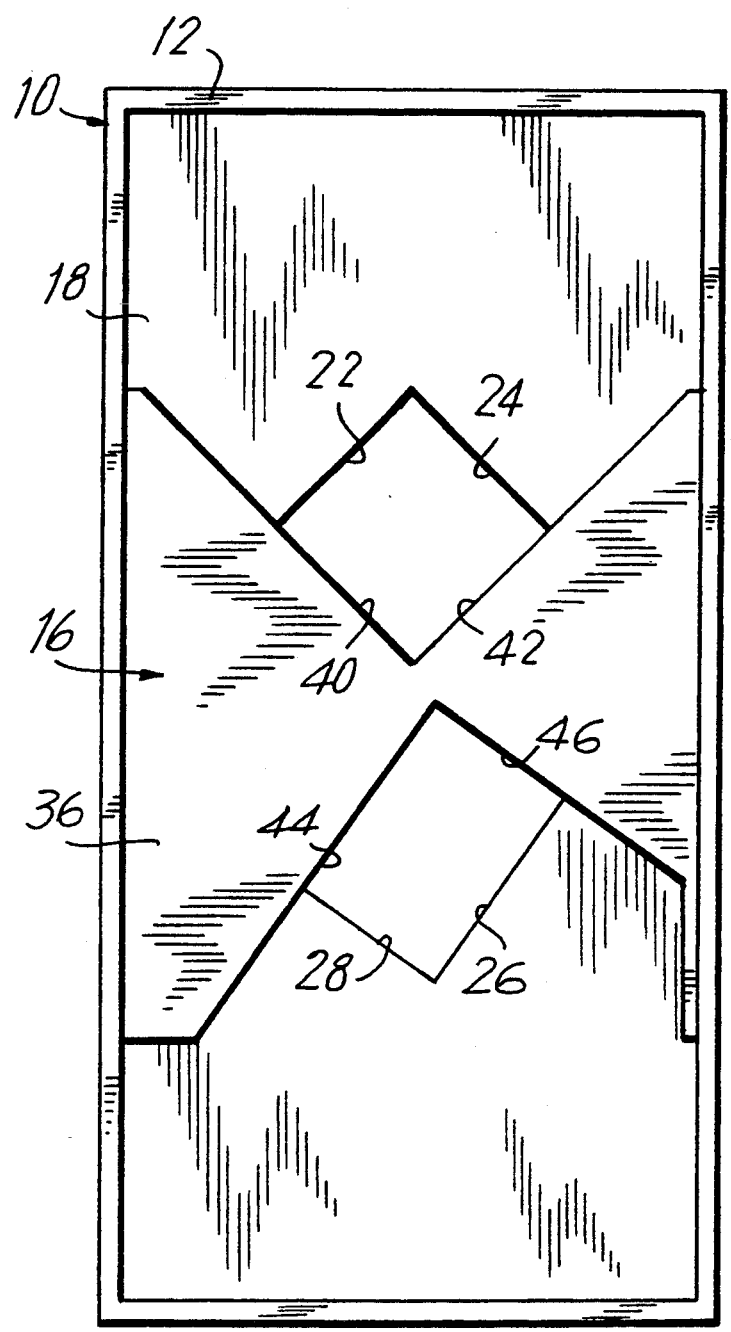
FIG. 8 is a view similar to FIG. 6 in an alternate position.
Figure 9:
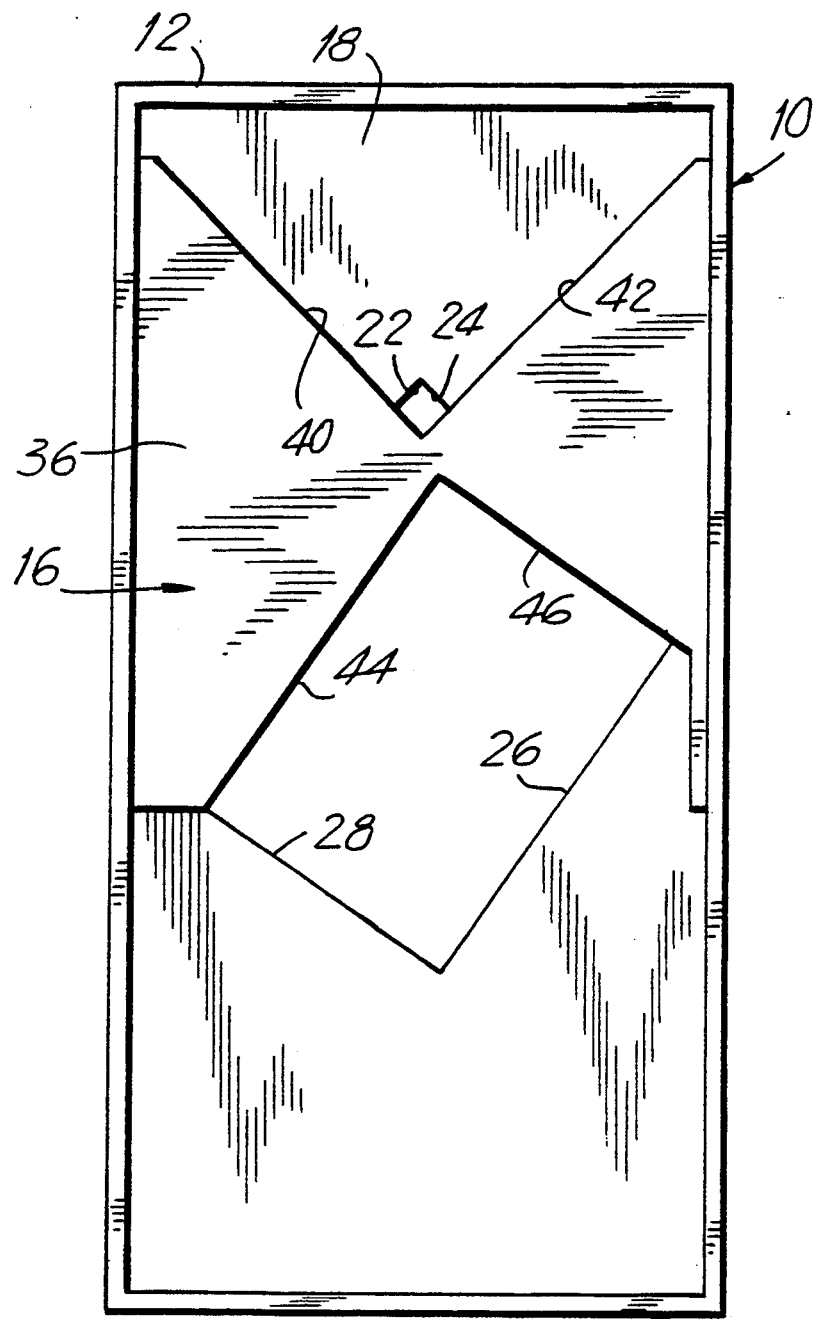
FIG. 9 is a view similar to FIG. 6 in yet another alternate position.

In FIG. 7, extremely large opening 70 and extremely small opening 80 can be formed by the juxtaposition of slide plate 16 within frame 10.

It is apparent from the other illustrative examples, that any size or shape of square or rectangular opening can be formed, giving the user unlimited variations.

We claim:

1. A cropper for use in the photographic or graphic design arts comprising:
   a first sheet consisting of a thin rigid material and equipped with a flanged track around its perimeter, said first sheet being further equipped with a pentagonal shaped window that is bounded by and within said perimeter,
   a second sheet consisting of a thin rigid material that fits into and is slidably movable within said flanged track of said first sheet forming a first window and a second window.

2. The cropper of claim 1 wherein said first window is rectangular and said second window is square.

3. The cropper of claim 1 wherein said first and second window are variable in size.

4. The cropper of claim 2 wherein size of first window varies inversely with size of said second window as said second sheet slidably moves within said first rectangular sheet.

5. The cropper of claim 3 wherein said rigid material is steel.

6. The cropper of claim 3 wherein said rigid material is aluminum.

7. The cropper of claim 3 wherein said rigid material is plastic.

8. The cropper of claim 3 wherein said rigid material is fiberglass.

* * * * *